Figure 1:
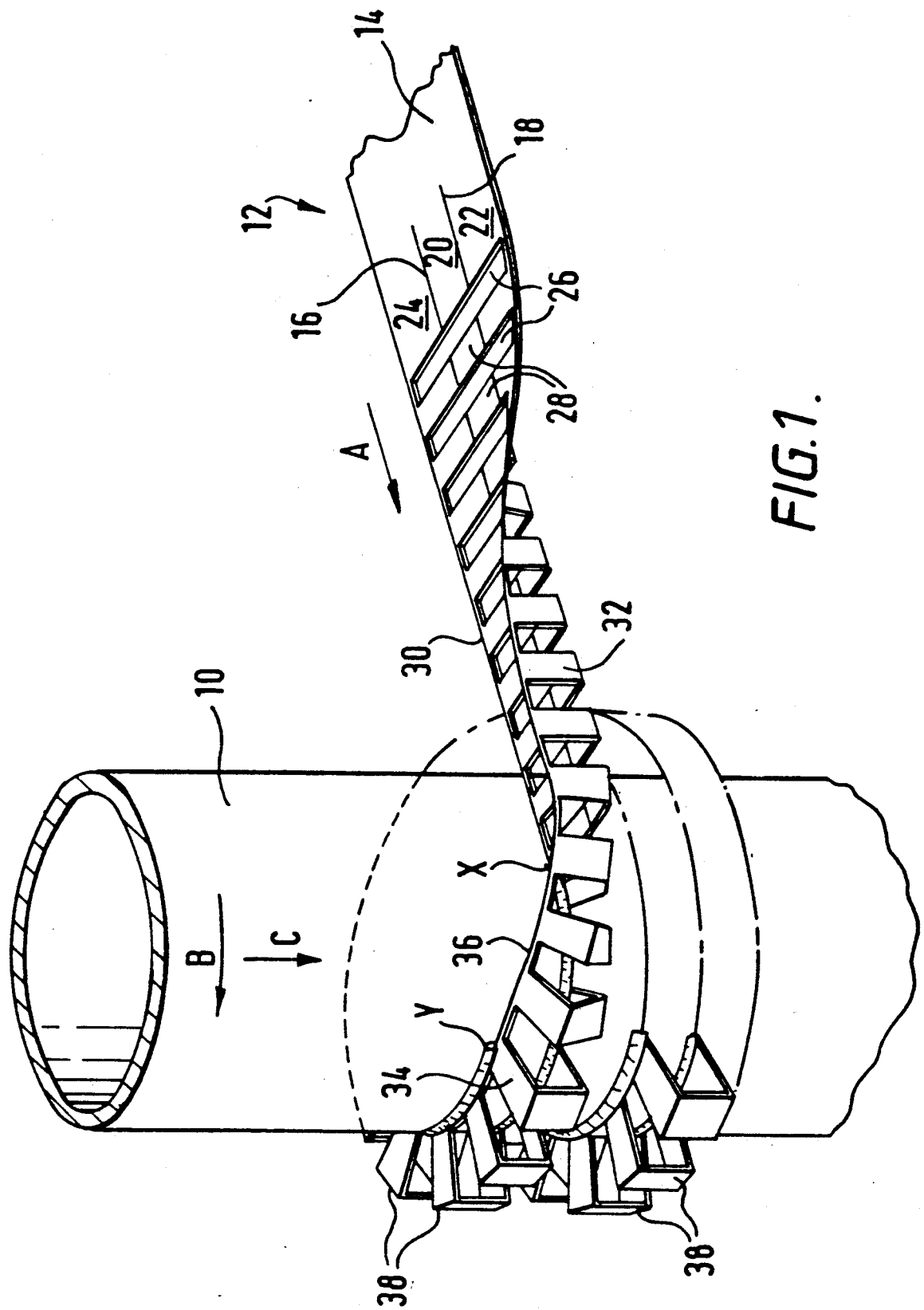

United States Patent [19]
Lloyd

[11] Patent Number: 5,031,694
[45] Date of Patent: Jul. 16, 1991

[54] HEAT EXCHANGE DEVICE AND METHOD OF MANUFACTURE THEREFOR

[75] Inventor: Jonathan D. H. Lloyd, Harrogate, United Kingdom

[73] Assignee: H.E.T. Limited, Winchester, England

[21] Appl. No.: 376,424

[22] Filed: Jul. 7, 1989

[30] Foreign Application Priority Data

Jul. 8, 1988 [GB] United Kingdom ............... 8816304

[51] Int. Cl.⁵ .................................................. F28F 1/36
[52] U.S. Cl. .................... 165/184; 29/890.048; 165/146
[58] Field of Search .............. 165/184, 182, 181, 146; 29/157.3 A, 157.3 AH, 890.48

[56] References Cited

U.S. PATENT DOCUMENTS

| | | | |
|---|---|---|---|
| 1,744,074 | 1/1930 | Gortner | 165/184 |
| 1,960,305 | 8/1933 | Emmons et al. | 165/184 |
| 2,308,319 | 1/1943 | Stanton | 165/184 |
| 2,372,795 | 8/1942 | Rodeck | 165/184 |
| 2,790,628 | 4/1957 | Barnes | 165/184 X |
| 2,807,074 | 9/1957 | Schroeder | 29/157.3 |
| 2,870,999 | 1/1959 | Söderström | 165/184 |
| 3,021,804 | 2/1962 | Simpelaar | 113/118 |
| 3,045,979 | 7/1962 | Huggins et al. | 165/152 |
| 3,158,122 | 11/1964 | deGive | 113/118 |
| 3,288,209 | 11/1966 | Wall et al. | 165/184 |
| 3,397,440 | 8/1968 | Dalin | 29/157.3 |
| 3,455,379 | 7/1969 | Habdas | 165/184 |
| 3,550,235 | 12/1970 | Jarvis et al. | 29/157.3 AH |
| 4,184,544 | 1/1980 | Ullmer | |
| 4,332,293 | 6/1982 | Hiramatsu | 165/153 |
| 4,763,726 | 8/1988 | Failing | 165/146 |

FOREIGN PATENT DOCUMENTS

| | | |
|---|---|---|
| 0214784 | 3/1987 | European Pat. Off. |
| 50-125147 | 10/1975 | Japan |
| 271122 | 5/1927 | United Kingdom |
| 314843 | 7/1929 | United Kingdom |
| 343453 | 3/1931 | United Kingdom |
| 800265 | 8/1958 | United Kingdom |
| 833485 | 4/1960 | United Kingdom |
| 989567 | 4/1965 | United Kingdom |
| 1132526 | 11/1968 | United Kingdom |
| 1272621 | 5/1972 | United Kingdom |
| 1382783 | 2/1975 | United Kingdom |
| 2027531A | 2/1980 | United Kingdom |

OTHER PUBLICATIONS

"Compact Heat Exchangers for G. E. Products—60 Years of Advances in Design & in Manufacturing Technologies"; Abbott et al. (ASME Paper) reprinted from *Compact Heat Exchangers: History, Technological Advancement and Mechanical Design Problems, HTD;* vol. 10, ed. by Shah et al.

*Primary Examiner*—Allen J. Flanigan
*Attorney, Agent, or Firm*—Hale and Dorr

[57] ABSTRACT

A heat exchanger device is manufactured by providing a heat exchanger body (10) and a plurality of fins (28) formed from a metal strip (14) having a plurality of slots or slits (26) extending transversely of the strip (14) and defining the fins (28). The strip (14) has at least one continuous longitudinal strip portion (30), so that when the strip (14) is bent or folded appropriately the continuous portion or portions can be welded to the body (10).

12 Claims, 5 Drawing Sheets

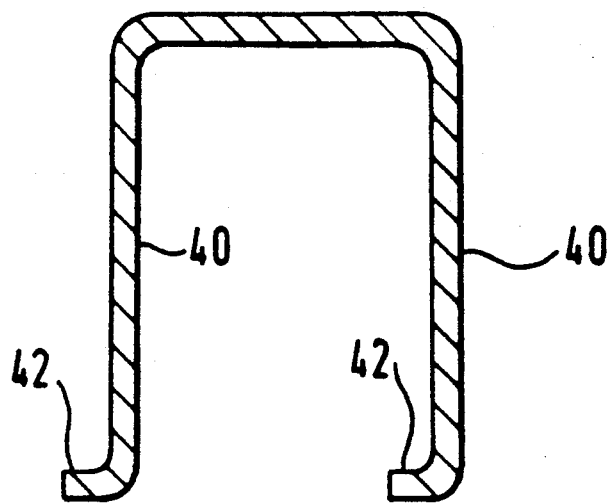
FIG.2.a
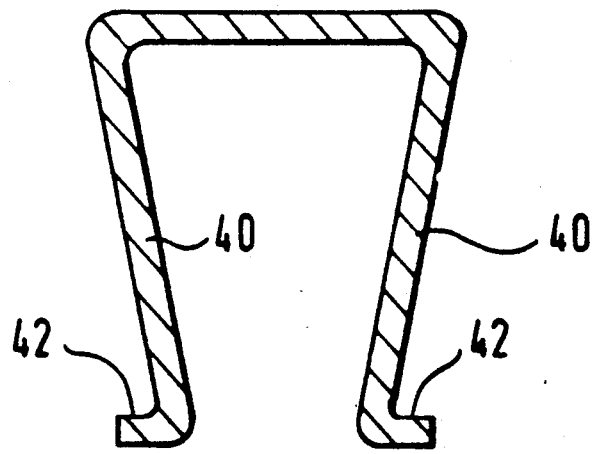
FIG.2.b
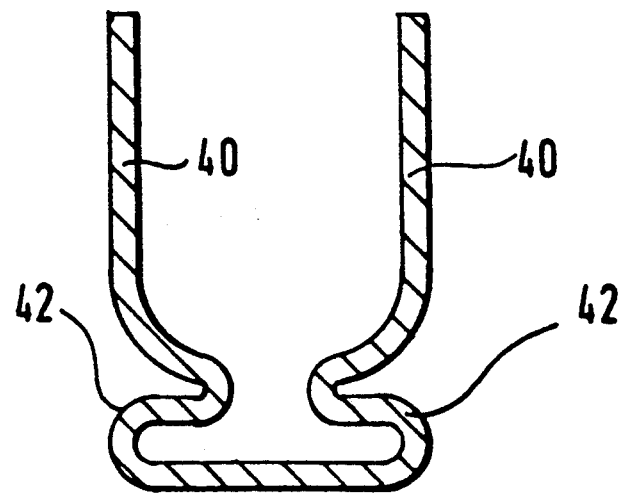
FIG.2.c

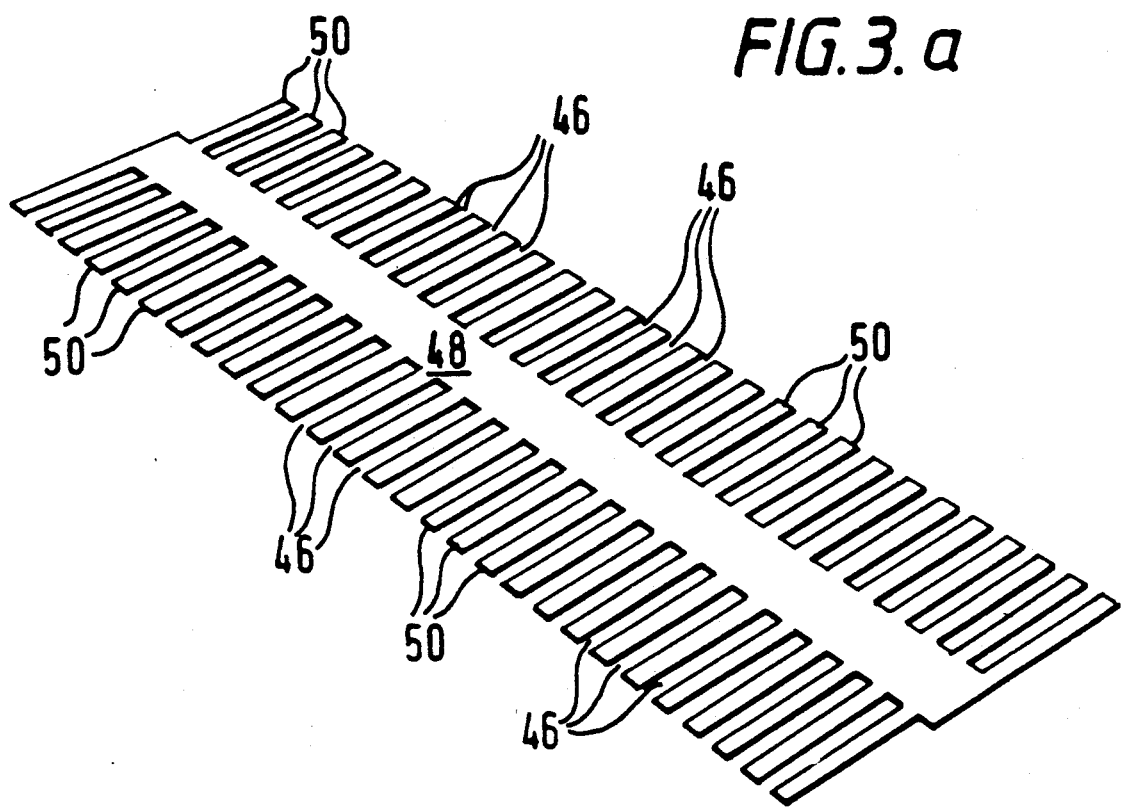
FIG. 3.a
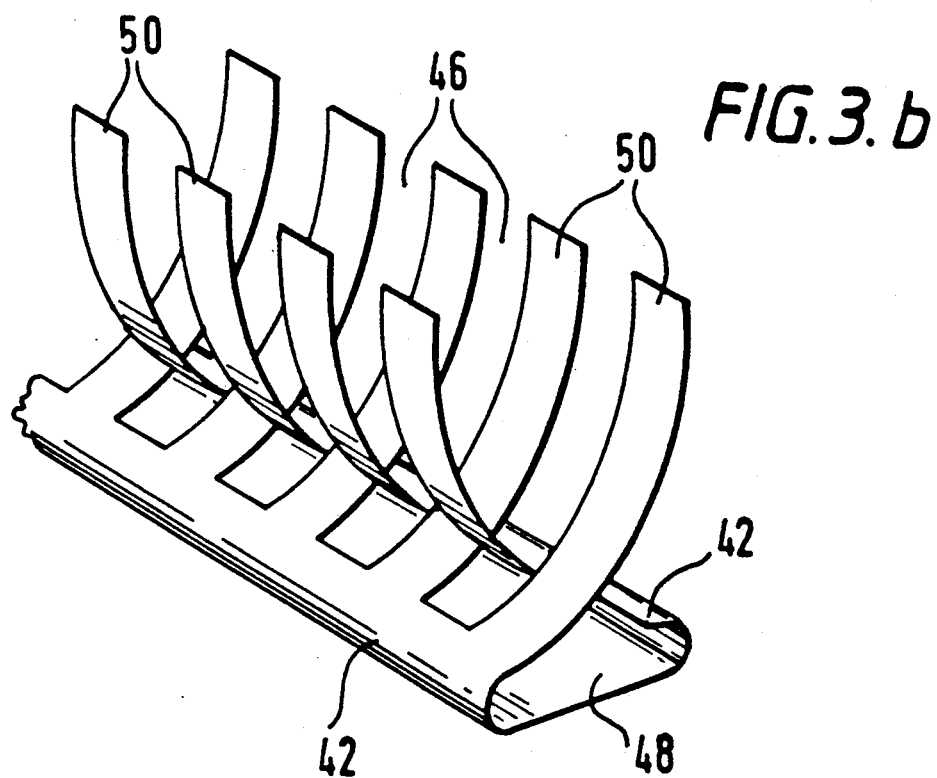
FIG. 3.b

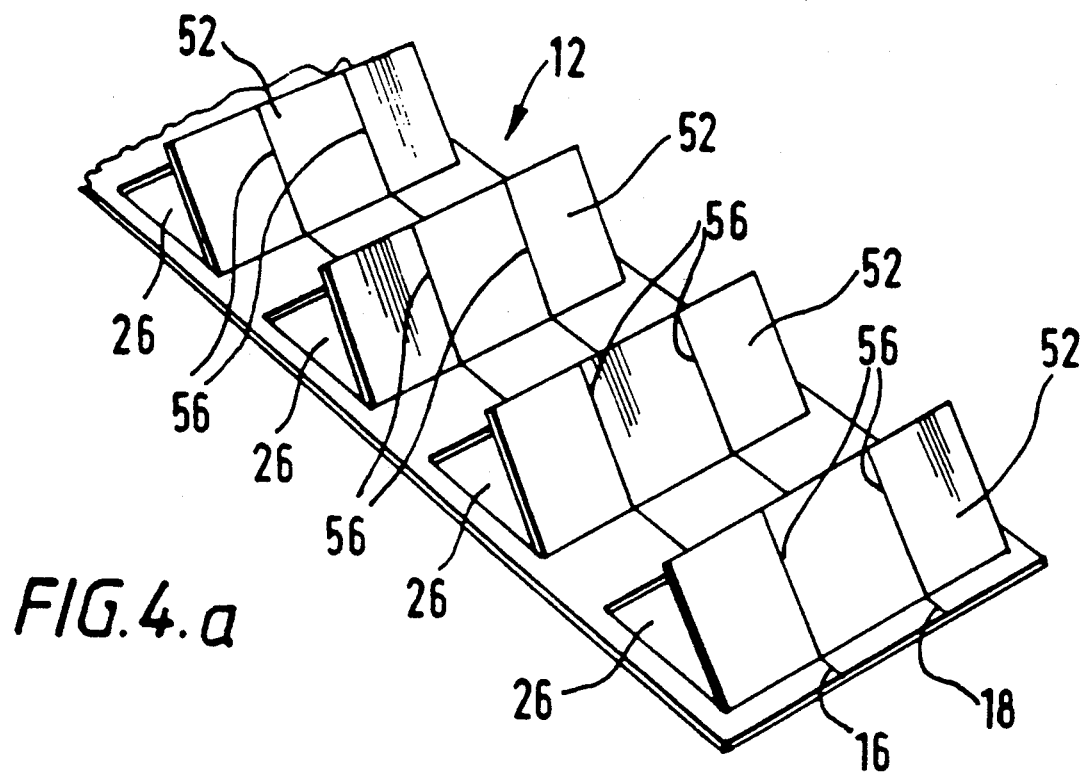
FIG.4.a
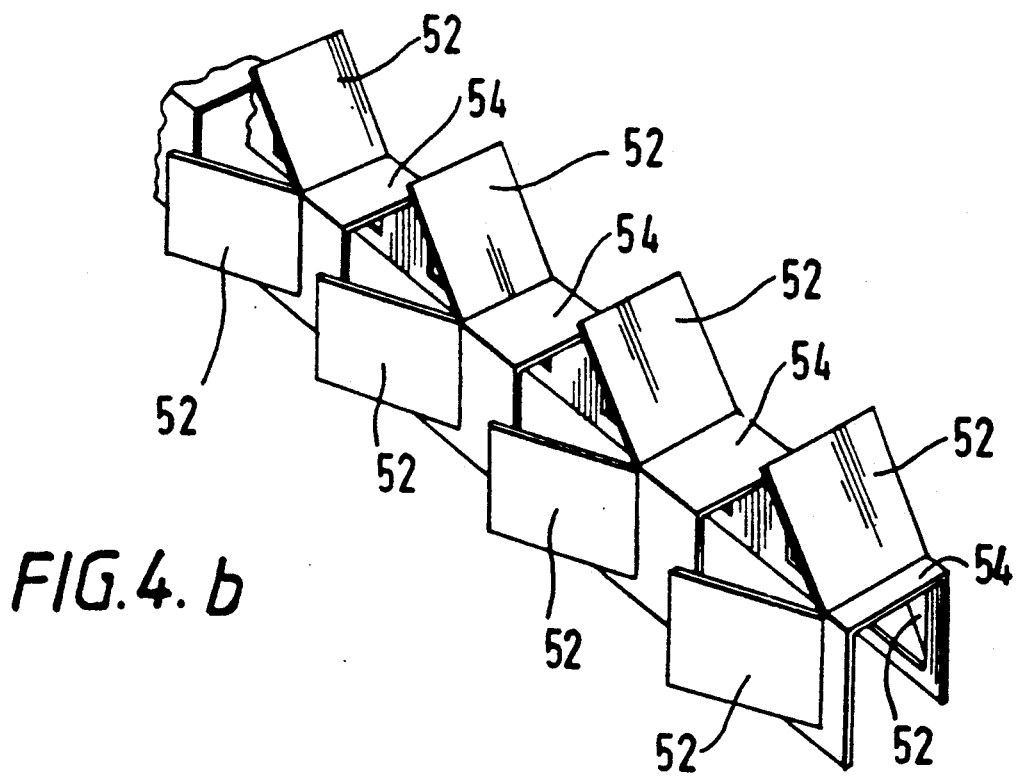
FIG.4.b

HEAT EXCHANGE DEVICE AND METHOD OF MANUFACTURE THEREFOR

This invention relates to a heat exchange device, and more particularly to a heat exchange device of the extended-surface type comprising a tube or plate having fins bonded thereto for improved heat transfer characteristics. This invention also relates to a method of manufacture for such a device.

The design of heat exchange devices is influenced by several factors, the aim being to produce a device which fulfils its performance objectives while being as cheap as possible to manufacture. Unfortunately, many existing heat-exchange devices fail to combine adequate performance with low manufacturing costs; high-performance heat exchangers are usually expensive to make, and inexpensive heat exchangers may be inadequate for certain, demanding applications.

As an example, one of the most efficient existing forms of heat-exchanger fin is the 'pin' fin which is usually made up of wire loops or individual studs or rods. Where studs or rods are used, each fin is separate from its neighbour and has to be individually positioned and bonded to a heat exchanger tube or plate, which is clearly a complex, lengthy and expensive task given the large number of fins which may be required. On the other hand, wire-loop fins are made from continuous metal wire such that each loop is directly connected to its neighbours, which facilitates manufacture because the fins can be positioned and bonded en masse.

Easier production makes heat exchangers with wire-loop fins cheaper and therefore more popular than those with stud or rod fins, but wire-loop fins still have several drawbacks relating especially to the method by which the fins are bonded to the heat exchanger tube or plate during manufacture. In particular, it can be difficult or impossible to weld wire-loop fins into place when they are brought into contact with the heat exchanger tube or plate, because at that stage the fins' shape and layout may preclude access by a welding electrode. It is therefore usual to attach the fins to the tube or plate by soldering or silver brazing which not only severely limits the maximum operating temperatures of wire-loop finned heat exchangers but also restricts the choice of heat-exchanger materials to those which can be readily soldered or brazed as the case may be. At present, light alloys cannot be used to make wire-loop finned heat exchangers because it is very difficult to solder light alloys such as aluminium without creating potential corrosion areas around the joint.

The temperature limitation, caused by the possibility of melting, is a serious drawback which hampers use of wire-loop finned heat exchangers in high-temperature applications such as oil coolers for turbochargers and rotary compressors. Moreover, wire-loop heat exchangers tend to be heavy, which is a problem in for example automotive or aerospace applications where weight-saving is important.

Other heat exchangers have fins made of metal strip or ribbon, which is usually cheaper than wire, and several fin configurations of this type are known. Again, however, these heat exchangers suffer several drawbacks, some exchangers requiring many complex manufacturing operations and others having fin layouts which have inefficient heat transfer characteristics. In particular, some fin configurations are designed to allow spot-welding so that the heat exchanger can operate at high temperatures, but spot-welding is inferior to continuous welding because a spot weld provides a far smaller heat-transfer path to the fin than does a continuous weld.

An object of this invention is to provide an improved heat exchanger device, and a method for its manufacture, which overcomes or mitigates the disadvantages of known devices and manufacturing methods.

According to one aspect of this invention there is provided a heat exchanger device including a body having a plurality of fins attached thereto, the fins being formed from a strip provided with a plurality of transverse slots or slits which define the fins, wherein the fins are connected by a continuous strip portion which is attached to the body.

The strip is advantageously bent or folded into a substantially 'U' or 'C' cross-sectional shape, and the continuous strip portion may be formed into a lip or flange to facilitate attachment to the body.

According to another aspect of this invention there is provided a method for producing a heat exchanger device, including the steps of: providing a strip with a plurality of transverse slots or slits defining a plurality of transverse webs, the webs being connected by a continuous strip portion; bringing the continuous strip portion into contact with a heat exchanger body, and; attaching the continuous strip portion to the body.

In a preferred embodiment, the strip is provided with a plurality of transverse slots leaving two continuous strip portions, one extending along each longitudinal edge of the strip. In the preferred embodiment, the strip is subjected to one or more folding or bending operations so that both continuous strip portions are brought into contact with the body for attachment thereto. In another embodiment the strip is provided with transverse slits which extend inwardly from the longitudinal edges of the strip, leaving a central logitudinally-extending continuous strip portion. The strip is then preferably bent or folded so that the central continuous strip portion can be brought into contact with the body for attachment thereto.

It is preferred that the strip is attached to the body by welding, although it would also be possible to employ brazing if the strip and/or tube materials were, for example, made of aluminium clad with a brazing alloy.

Figure 5:
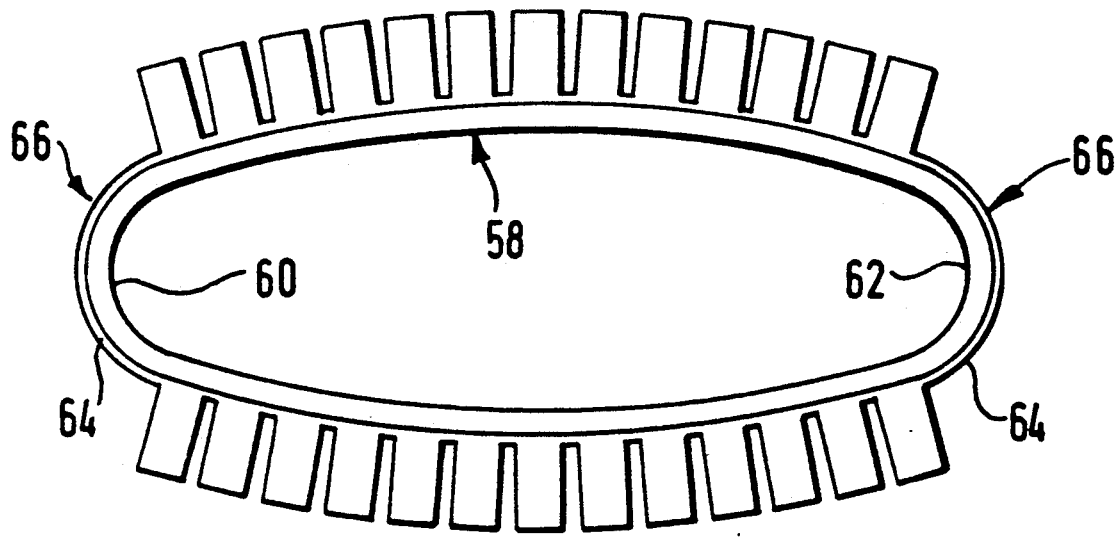

Embodiments of this invention will now be described, by way of example, with reference to the accompanying drawings in which:

FIG. 1 is a schematic perspective view illustrating a preferred embodiment of this invention;

FIGS. 2(a), 2(b) and 2(c) are schematic cross-sectional views illustrating various embodiments of this invention;

FIGS. 3(a) and 3(b) are schematic perspective views of another embodiment of this invention;

FIGS. 4(a) and 4(b) are schematic perspective views of a further embodiment of this invention;

FIG. 5 is a schematic end view illustrating one of the advantages of this invention.

Referring to FIG. 1 of the drawings, a preferred embodiment of this invention is shown in relation to a circular-section heat-exchanger tube 10, although it is envisaged that this invention can be applied with equal benefit to a tube having some other shape such as an elliptical cross-section.

In FIG. 1 a flat metallic strip 12, preferably of aluminium, is advanced from right to left in the direction of arrow A. Initially the strip 12 is plain as shown by reference numeral 14, but it is then preferably scored or indented with two lines of weakness 16, 18 in order to aid further processing as will be explained. The two lines of weakness 16, 18 are preferably equally spaced about the longitudinal axis of strip 12, so as to define a central strip portion 20 which has first 22 and second 24 outer strip portions on either side.

While in its flat state, strip 12 is provided with a plurality of equally-spaced slots 26, each slot being cut or stamped out of the strip. The preferred slotting method is stamping, and slotting may be performed at a separate, earlier stage to ensure that production can continue if the slotting machine should break down. Slots 26 extend transversely across almost the entire width of strip 12, leaving a row of spaced transverse webs 28. The webs 28 are linked to one another at their respective ends by the thin edge portion of strip material which remains at the respective ends of the slots 26.

After being provided with slots, the strip 12 is fed towards tube 10 along a tangential path so as to bring the edge 30 of the second outer strip portion 24 into contact with the tube's outer surface. Tube 10 is rotated in the direction shown by arrow B at a speed which is synchronised with the feed rate of strip 12, so that there is no relative movement between the surface of the tube and the strip where they come into contact with one another. The edge 30 of portion 24 is then continuously welded onto the outer surface of tube 10 as it progressively contacts the tube at point X.

The synchronisation between tube 10 and strip 12 is suitable effected by the welding attachment of the strip to the tube, the rotation of the tube drawing the strip at the correct feed rate.

As it rotates, tube 10 is also advanced along its longitudinal axis as indicated by arrow C so that the strip 12 is wound around the tube in a helix, the pitch of the helix being determined by the speed of advance.

Either before or slightly after the edge 30 is welded to the tube 10, the strip 12 is advanced through bending means, such as rollers or the like, which bend the strip 12 along the line of weakness 18. The strip 1 is bent until its first outer portion 22 is in a plane which is perpendicular to that of the remainder of the strip, as shown at reference numeral 32. It is preferred that this bending operation is completed before the edge 30 is welded to tube 10, as illustrated in FIG. 1, so as to maximise the room which is available near to the tube.

Once the edge 30 of strip 12 has been welded to the tube 10, the strip is advanced through further bending means which bend the strip 12 along the line of weakness 16. This second bending operation brings the central strip portion 20 into a plane which is perpendicular to that of the second outer strip portion 24. The strip 12 therefore assumes a 'U'- or 'C'-shaped section, as shown at reference numeral 34, with the first and second outer strip portions 22, 24 parallel to one another and separated by the mutually perpendicular central strip portion 20.

Once the second bending operation is complete, the edge 36 of first outer strip portion 22 comes into contact with the outer surface of tube 10 at point Y. The edge 36 is then welded to the tube's surface, thereby forming a heat exchanger with radially-extending 'U'- or 'C'-shaped fins 38 which are formed from the webs 26.

As will be clear to those skilled in the art, there is sufficient room around point X for a welding head to enjoy unobstructed access, thereby allowing continuous welding at point X. Once the position of point X has been fixed, the relative position of point Y can be selected to allow sufficient room for carrying out the second bending operation. Moreover, a second welding head can readily gain access to point Y to allow continuous welding.

The welding operations involved in the manufacturing process of this invention can be carried out by any suitable means such as arc, gas or laser welding.

The provision for continuous welding is a major advantage of the present invention, providing a bond between the fin and the heat exchanger tube which is resistant to high temperatures and which is very strong. As has been mentioned, continuous welding provides a wider heat transfer path than does spot welding, which promotes efficient heat transfer characteristics.

This invention also provides many of the manufacturing benefits of wire-loop finned heat exchangers because the fins are connected to one another as part of the same strip, and are therefore largely self-positioning in the desired layout when the strip is wound onto a heat exchanger tube. Indeed, this invention provides manufacturing benefits over and above those of wire-loop heat exchangers because the fins can be produced from strip by bending more quickly and cheaply than if they were produced from wire by looping.

A further benefit of this invention is that in preferred embodiments both 'legs' of each fin can be continuously welded, which again increase the width of the heat transfer path.

It is envisaged that several forms of heat-exchanger fin may be employed. FIGS. 2(a), 2(b) and 2(c) illustrate various fins each of which has legs 40 provided with flanges or lips 42. The lips 42 are situated at the base of each leg in order to facilitate welding, and to this end the lips can face in the same direction as shown in FIG. 2(a). This shape is particularly suitable for use when one side of a leg is inaccessible to a welding head as may be the case if, for example, the helix pitch is short. In another embodiment, shown in FIG. 2(b), the legs 40 taper towards each other towards the base of the fin so that the lips do not increase the fin's overall width, thereby allowing the fins to be closely wound. FIG. 2(c) illustrates a fin comprising two upstanding legs 40 attached to a longitudinally-extending web, the base of each leg having a lip 42 by means of which the web can be attached to the surface of a heat exchanger.

A further form of fin is illustrated in FIGS. 3(a) and 3(b) and comprises a metallic strip 44 having rows of parallel slits 46 cut transversely therein as best shown in FIG. 3(a). The slits extend inwardly from each edge of the strip, leaving a central, longitudinally-extending web 48 with transverse rows of fingers 50 radiating therefrom. The rows of fingers 50 are preferably arranged in staggered relation so that the strip can be bent as shown in FIG. 3(b), with the rows of fingers intersecting. This arrangement combines compactness with a large surface area for efficient heat transfer. As before, lips 42 may be provided towards the base of the fin to facilitate welding.

FIGS. 4(a) and 4(b) show that the slots 26 in strip 12 of FIG. 1 can be formed by cutting around three edges of a rectangle to produce a flap 52, leaving a long edge of the rectangle connected to the strip. The flap 52 can be bent about this edge to form a vane or louvre which is inclined relative to the strip, as shown in FIG. 4(a). FIG. 4(b) shows that the strip can then be bent to form fins 54, which are similar to fins 38 in FIG. 1 but whose flaps provide a still larger surface area for improved heat transfer characteristics. The flaps 52 are provided with slits 56 to facilitate bending about lines of weakness 16, 18.

A further advantage of this invention is illustrated in FIG. 5, which shows how fins may be applied to a heat exchanger tube 58 of flattened section. For reasons of flow dynamics it can be advantageous to have no fins on the small-radius leading 60 and trailing 62 edges of the tube 58. This invention allows fins, carried and connected by a web 64 or the like, to be wound around the tube 58 in continuous fashion by providing occasional 'gaps' 66 in which the web 64 has no fins. These gaps 66 are provided at appropriate positions to ensure that fins are placed only where required as the web is wound around the tube 58.

I claim:

1. Heat exchanger device including a body comprising a flattened tube section having leading and trailing edges with a plurality of fins connected thereto, wherein the fins are formed from a strip provided with a plurality of transverse slots or slits between two continuous strip portions, one extending along each longitudinal edge of the strip, which define the fins and with a plurality of gaps arranged such that the fins are absent at selected intervals along its length, and wherein the fins are connected by the continuous strip portions which are attached to the body, the the body, the position of the gaps being such that the fins are situated between, but are absent at, such edges.

2. A heat exchanger device according to claim 1, wherein the strip is welded to the body.

3. A method of producing a heat exchanger device, including the steps of:
   providing a strip with a plurality of transverse slots or slits defining a plurality of transverse webs which are connected between two continuous strip portions, one extending along each longitudinal edge of the strip, and with a plurality of gaps arranged such that the webs are absent at selected intervals along its length;
   subjecting the strip to at least one bending or folding operation; bringing both continuous strip portions into contact with a heat exchanger body comprising a flattened tube section having leading and trailing edges; and
   attaching the continuous strip portions to the body, the positions of the gaps being such that said webs are situated between, but are absent at, said edges.

4. Method according to claim 3, wherein the strip is attached to the body by welding.

5. A heat exchanger device including a body comprising a flattened tube section having leading and trailing edges with a plurality of fins connected thereto, wherein the fins are formed from a strip provided with a plurality of transverse slots or slits which define the fins in the form of louvres and with a plurality of gaps arranged such that the fins are absent at selected intervals along its length, and wherein the fins are connected by a continuous strip portion which is attached to the body, the position of the gaps being such that the fins are situated between, but are absent at, such edges.

6. A heat exchanger device according to claim 5, wherein the strip is folded into a substantially "u" or "c" cross-sectional shape and the louvres are formed on each side of the folded strip.

7. A heat exchanger device including a body having a plurality of fins connected thereto, wherein the fins are formed from a strip provided with a plurality of transverse slots or slits between two continuous strip portions, one extending along each longitudinal edge of the strip, which define the fins in the form of slanted flaps, and wherein the strip is folded and the fins are connected by the continuous strip portions which are attached to the body.

8. A heat exchanger device according to claim 7, wherein the louvres are formed on each side of the folded strip.

9. A method of producing a heat exchanger device, including the steps of:
   providing a strip with a plurality of transverse slots or slits defining a plurality of transverse webs in the form of louvres which are connected by continuous strip portions, at least one extending along each longitudinal edge of the strip, and with a plurality of gaps arranged such that the webs are absent at selected intervals along its length;
   subjecting the strip to at least one bending or folding operation,
   bringing both continuous strip portions into contact with a heat exchanger body comprising a flattened tube section having leading and trailing edges; and
   attaching the continuous strip portion to the body, the positions of the gaps being such that said webs are situated between, but are absent at, said edges.

10. A heat exchanger device according to claim 1, wherein the strip is folded into a substantially "U" or "C" cross-sectional shape.

11. A heat exchanger device according to claim 5, wherein the strip is welded to the body.

12. A method according to claim 9, wherein the strip is attached to the body by welding.

* * * * *